United States Patent [19]

Sebald, deceased

[11] 4,372,126
[45] Feb. 8, 1983

[54] CLOSED CYCLE SYSTEM FOR GENERATING USABLE ENERGY FROM WASTE HEAT SOURCES

[75] Inventor: Joseph F. Sebald, deceased, late of Bloomfield, N.J., by Dorothy Davis Sebald, executrix

[73] Assignee: Heat Power Products Corporation, Bloomfield, N.J.

[21] Appl. No.: 259,531

[22] Filed: May 1, 1981

[51] Int. Cl.³ ............................................. F01K 11/00
[52] U.S. Cl. .................................. 60/669; 60/641.7; 60/670
[58] Field of Search ...................... 60/641.7, 669, 670, 60/651, 671; 165/45; 290/1 A

[56] References Cited

U.S. PATENT DOCUMENTS

| | | | |
|---|---|---|---|
| 2,006,985 | 7/1935 | Claude et al. | 60/641.7 X |
| 4,189,647 | 2/1980 | Wittig | 60/641.7 X |
| 4,189,924 | 2/1980 | LaCoste | 60/641.7 |

*Primary Examiner*—Allen M. Ostrager
*Assistant Examiner*—Stephen F. Husar

[57] ABSTRACT

A closed cycle system for generating usable energy from heat sources wherein the available temperature difference between the heat source and the heat sink is 40° F. or greater such as in tropical ocean waters having a temperature gradient between the surface water and the below surface waters has a steam or gas turbine operatively mounted on and associated with an evaporator-condenser assembly for generating and delivering vapors such as steam for driving the turbine and for condensing steam exhausting from said turbine. The evaporator-condenser assembly has a common wall between the evaporator section and the condensing section and also a U-shaped seal and transfer passage therebetween for transferring condensed fluid from the condensing section to the evaporating section. Due to the large volume of vapors required at the relatively low temperature at which this system operates, the evaporating section has a pump delivery system and a cascade tray system to adjust the rate of evaporation of the working fluid such as water therein.

The system as above described including a condensing section for obtaining distilled water as a by-product of the operation of the system.

5 Claims, 6 Drawing Figures

CLOSED CYCLE SYSTEM FOR GENERATING USABLE ENERGY FROM WASTE HEAT SOURCES

BACKGROUND OF THE INVENTION

This invention relates generally to ocean thermal energy conversion systems and more particularly to a closed cycle system for converting heat sources of low to moderate differential temperatures into usable energy.

The nation's greatly increased concern for the efficient utilization of our energy resources has stimulated the development of systems and associated equipment to convert the energy from waste heat sources or low level heat sources, to useful mechanical or electrical power.

Among the systems which have been developed are those utilizing the available temperature difference between a heat source source and a heat sink such as those which utilize the difference between the temperature of ocean surface waters and the deeper and cooler below surface waters generally in tropical areas which systems are classified as ocean thermal energy conversion systems, hereinafter OTEC Systems. In these OTEC Systems, generally the available temperature difference between the heat source which is the ocean surface waters and the heat sink which is the deeper and cooler below surface waters will be in the order of 40° F. or greater.

Heretofore, certain prior art closed cycle systems for recovering the heat energy from such differential temperature in ocean waters have been designed and developed such as is shown in U.S. Pat. Nos. 2,006,985; 3,995,160; 4,083,189; 4,014,279; 3,967,449; and 2,595,164.

Some of these systems are highly desirable because they utilize water as the thermo-dynamic working fluid. Water as the thermo-dynamic working fluid offers a number of advantages over other thermo-dynamic working fluids. It is a high heat transfer fluid that operates at low pressures (15 PSIG) and in temperature ranges generally in the order of 70° F. to 250° F. for the water vapor temperature. These characteristics permit the use of low cost heat transfer equipment and structures, which has the further advantage in that current technology of such associated heat transfer equipment and apparatus is well developed and substantiated. Further, water is a low cost working fluid and permits the use of conventional materials of construction, presents minimal environmental problems, offers low maintenance cost, and minimal safety consideration.

The present invention seeks to provide an improved closed cycle system for generating usable energy more particularly from the ocean thermal energy available in ocean waters in which the structure and operation is primarily based on the use of water as the thermo-dynamic working fluid for driving a turbine which is operatively mounted on and associated with an evaporator-condenser unit so designed that the evaporating section and the condensing section have a common wall and includes, a U-shaped seal and transfer passage therebetween so as to simplify construction and permit the operative interrelation and function of these sections in accordance with the operating demands of the associated steam or gas turbine mounted thereon.

The present improved closed cycle system for generating usable energy also includes means for generating distilled water for makeup to the system or for use outside of the system.

SUMMARY OF THE INVENTION

Thus, the present invention provides an improved closed cycle system for recovering usable energy which includes, an evaporator-condenser assembly having an evaporating section and a condensing section, and a common partition shared between said evaporating section and said condensing section, each of said sections having a storage well for operating fluid, and said common partition having a transport passage means at the lowermost end defining a U-shaped seal between the respective storage wells for the evaporating section and condensing section and operative to pass operating fluid through said U-shaped seal from the storage well in the condensing section to the storage well in the evaporating section, said evaporating section including means for evaporating operating fluid means for maintaining a thin film on said means for evaporating operating fluid, and pumping means connected to deliver fluid from said heat source to evaporate said operating fluid, and a return means for returning said fluid to said heat source, energy converting means connected to said evaporator-condenser assembly having an inlet communicating with said evaporating section to receive the vaporized operating fluid therefrom and operable to convert the heat energy therein to usable energy, and an exhaust outlet for spent vaporized operating fluid, said condensing section communicating with the exhaust outlet of said energy converting means and including, means for condensing the exhausted vapor from said energy converting means, a pumping means connected to deliver cooling fluid from said heat sink to condense the exhausted vapor, and a return means for returning the cooling fluid to said heat sink.

Additionally, the close cycle system as above described including bypass means for partially bypassing a portion of the vaporized operating fluid about said energy converting means.

Accordingly, it is an object of the present invention to provide a closed cycle system and equipment capable of converting low grade thermal energy to usable mechanical or electrical power.

It is another object of the present invention to provide a system and equipment capable of converting low grade thermal energy to usable mechanical or electric power in which the thermo-dynamic working fluid utilized will be water.

It is another object of the present invention to provide a system and equipment capable of converting low grade thermal energy to usable mechanical or electric power which will include means and apparatus for producing distilled water by concurrent utilization of the available energy and heat sink in whole or in part.

Other objects and advantages will become more apparent from the following description taken with the accompanying drawings wherein:

DESCRIPTION OF THE INVENTION

Figure 1:
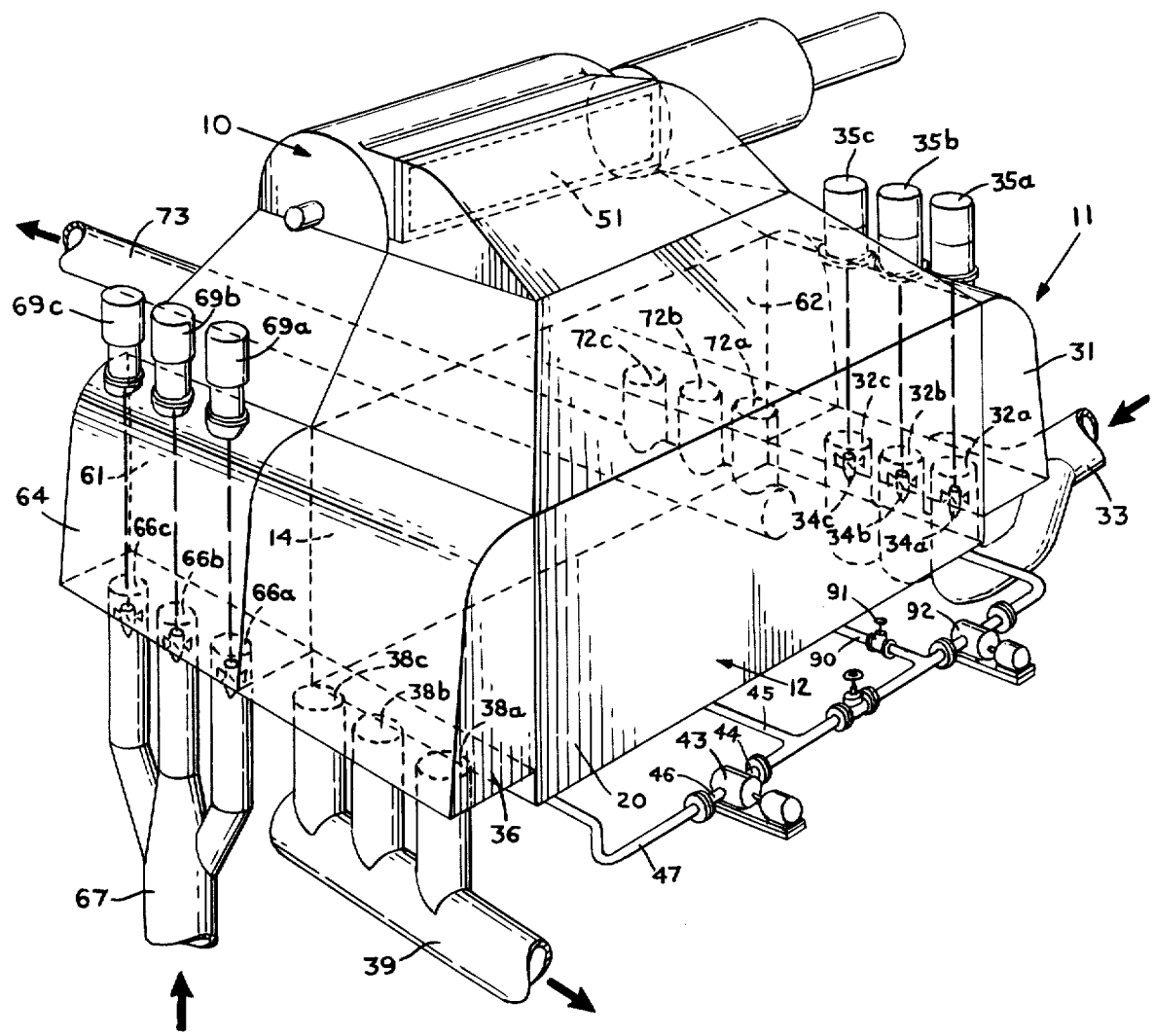
FIG. 1 is a perspective diagrammatic view of a closed cycle system for generating usable energy in accordance with the present invention.
Figure 2:
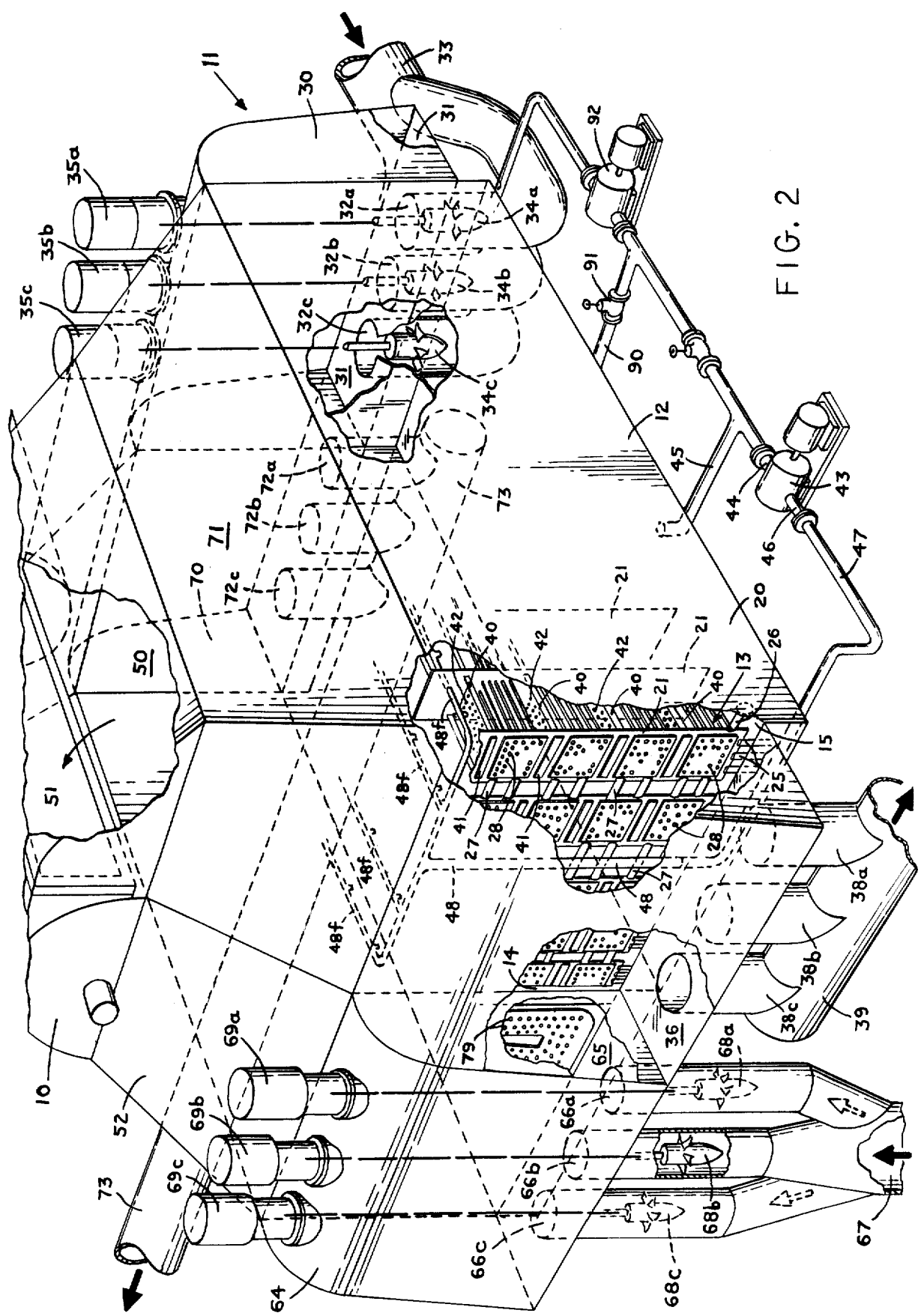
FIG. 2 is a partial enlargement in perspective view of the evaporator-condenser assembly of the closed cycle system shown in FIG. 1 partly broken away to show the components of the respective condenser section and evaporator section.

Referring to the drawings, FIGS. 1 and 2 show that the closed cycle system for generating usable energy in accordance with the present invention includes a turbine 10 which is fixedly connected to an evaporator-condenser assembly or unit generally designated 11.

The turbine will provide the mechanical energy developed by the system for driving a generator or a pump or other device as will be understood by those skilled in the art.

Evaporator-condenser assembly 11 has an evaporating section 12 and a condensing section 13 which are adjacent to each other and share a common wall 14. Further, the evaporating section 12 has a storage space 15 at the lowermost end thereof and similarly the condensing section has a condensate well 16 at its lowermost section and disposed between the storage well 15 and the condensate well 16 in operative association with the common wall 14 is a U-shaped seal and transport passage 17 which will act to permit condensate to flow or pass from the condensate well 16 through the U-shaped seal and transport passage 17 to the storage chamber or well 15 in the evaporating section 12 as a function of the differential pressure established between the condensing section 13 and the evaporating section 12 as is more fully described hereinafter.

In the preferred form of the present invention herein illustrated, the thermo-dynamic working fluid used will be water because of the advantages which attach thereto as above enumerated.

Water can be utilized in OTEC Systems of the type herein illustrated where the temperature difference between the heat source namely, the ocean and cooler below surface waters and namely, the ocean surface water and the heat sink namely, the deep and cooler below surface waters of the ocean will be in the order of 40° F. or more. Where the temperature difference between the heat source and the heat sink is greater, the more economical and more efficient will be the closed cycle system in accordance with the present invention.

It will be understood by those skilled in the art that while the present system is described with reference to water as the thermo-dynamic working fluid that alternate working fluids such as some of the fluorocarbon and hydrocarbon liquids can also be utilized. The selection of fluorocarbons or hydrocarbons as alternate working fluids requires consideration of their saturation pressure, the temperature characteristics of the heat source and heat sink, heat transfer characteristics of the liquid, toxicity, flamability, thermo-dynamic suitability as a power fluid, and cost. Such other fluids may be preferable under some thermo conditions and when distilled water is not a direct by-product requirement.

Referring further to FIGS. 1, 2, 3 and 4 the evaporating section 12 of the evaporator-condensor assembly 11 is designed and sized to provide the volumes of vapor such as steam where water is the working fluid as in the form of the invention illustrated in these FIGURES.

The parameters for a system in accordance with the invention as shown in FIGS. 1 to 4 of the drawings with respect to sizes and volumes of steam generated by this evaporating section and condensed by the associated condensing section of the evaporator-condensor assembly 11 are described under the operation of the system below.

Figure 3:
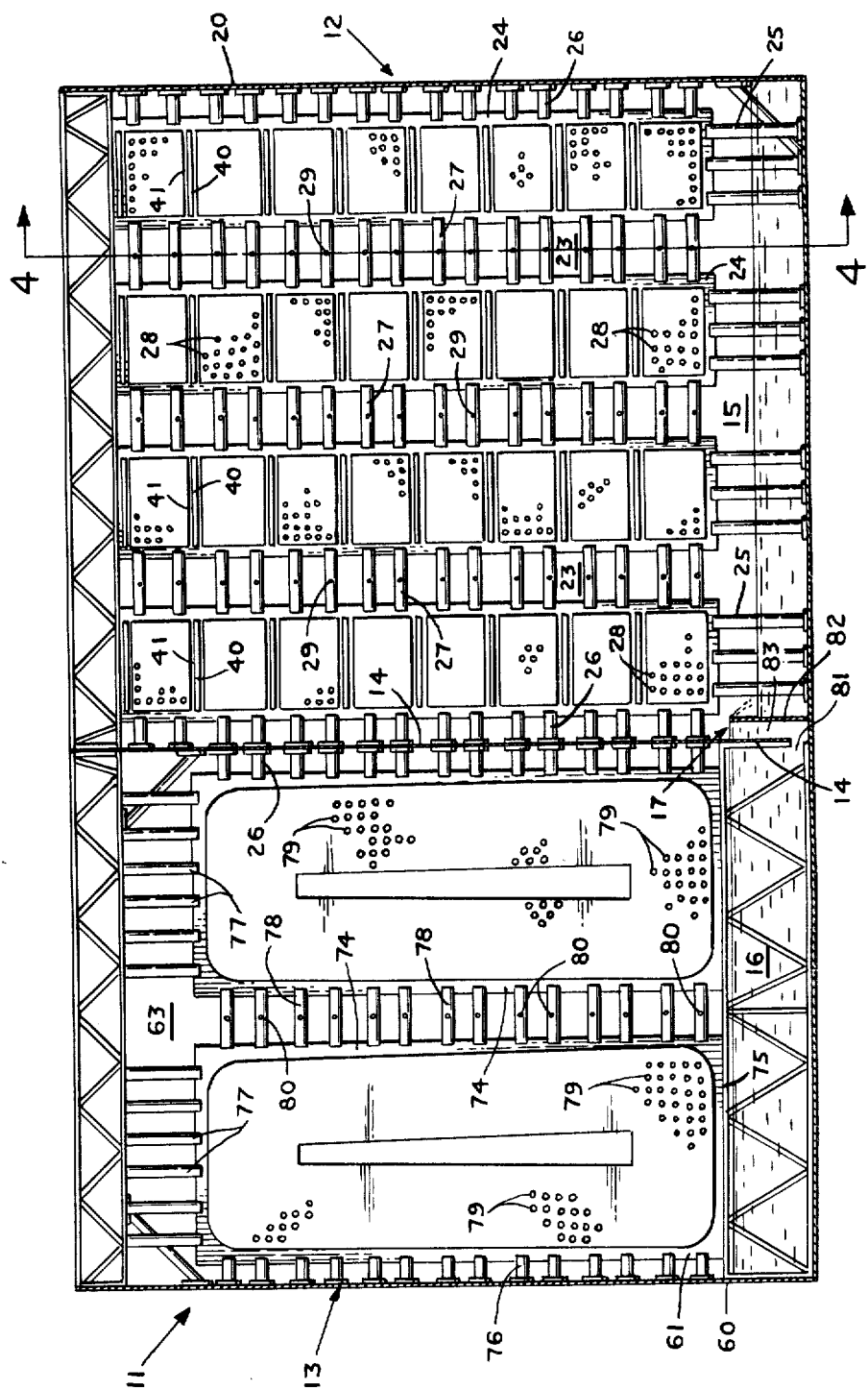
FIG. 3 is a cross section of the evaporator-condenser assembly taken at line 3—3 of FIG. 2.
Figure 4:
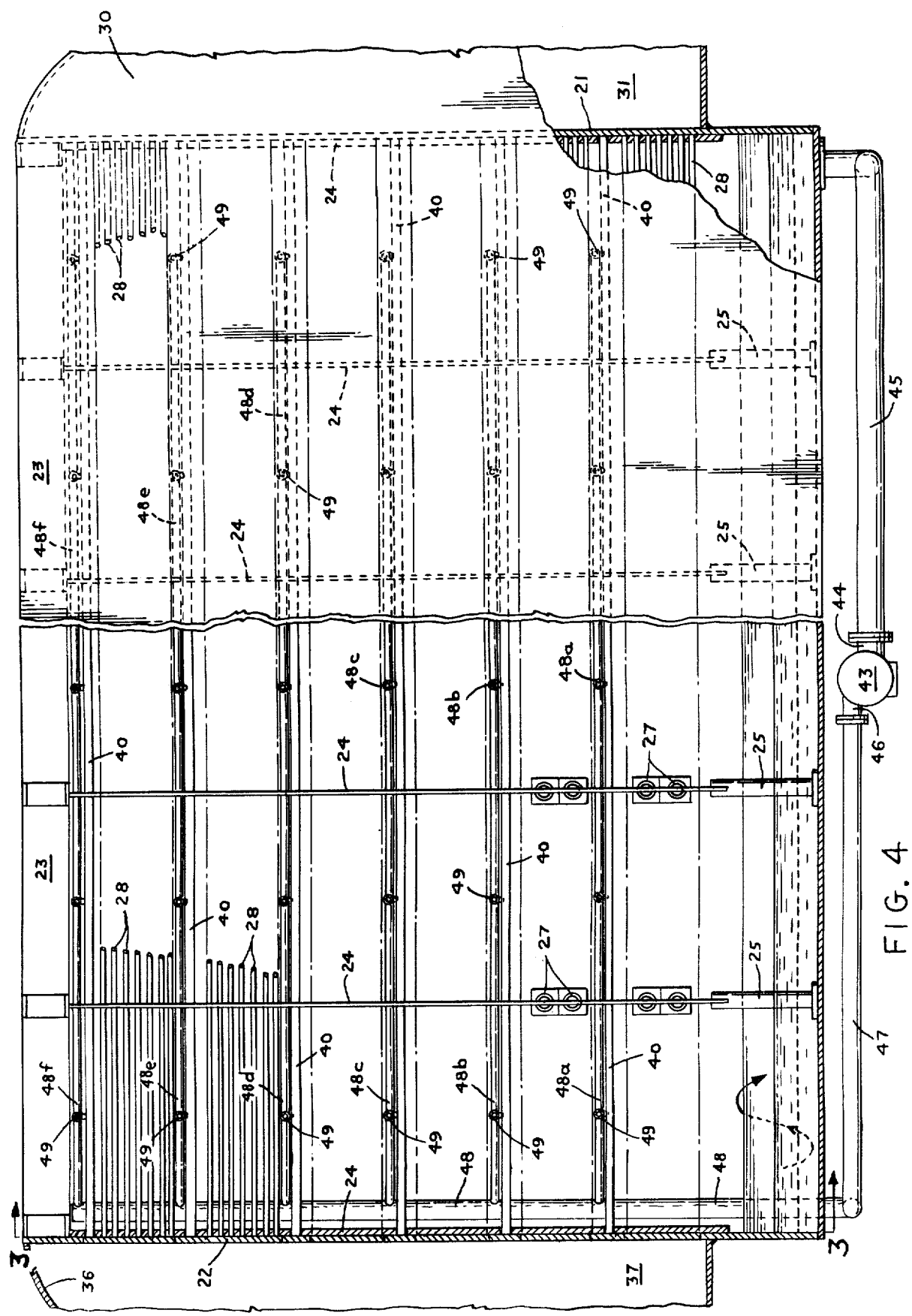
FIG. 4 is a longitudinal section taken on Line 4—4 of FIG. 3 showing the pumping system and the cascade tray system utilized in the evaporating section of the evaporator-condenser assembly of the closed cycle system for generating usable energy shown in FIGS. 1 and 2 of the drawings.

Evaporating section 12 is of the non-contacting shell and tube type and therefore includes an outer casing or closure 20 formed on one side, the common wall 14, and at the opposite ends the conventional spaced headers namely an inlet header 21 and an outlet header 22 are provided, these elements defining an evaporating space 23 closed at the lower end by the sump section as at 15 all of which is shown in FIGS. 3 and 4 of the drawings.

A plurality of transversely disposed tube sheets as at 24 are held in assembled position in the evaporator section by bottom supports 25, side supports 26 and intermediate supports 27 so that a plurality of longitudinally extending elongated tubes 28 can be connected and mounted therein so that one end of each of said tubes can be connected to the inlet header 21 and the opposite end to the outlet header 22 to define flow paths for warm surface ocean water through the evaporating space 23.

The intermediate supports 27 have an elongated connecting rods 29 extending therethrough to overcome potential problems of frequency vibration that might develop during the operation of the system due to the flow of the ocean water therethrough.

In this respect outboard of the inlet header 21 an inlet casing 30 connected about the inlet header 21 defines an inlet chamber 31 having a plurality of inlets as at 32a, 32b and 32c which communicate with a common supply duct 33 in turn communicating at the end remote therefrom with the heat source such as the hot surface ocean waters to be delivered to the evaporating section 12.

A plurality of pumps 34a, 34b and 34c operated by motors 35a, 35b and 35c are disposed in the inlets 32a, 32b, and 32c so that when the motors are placed in operation, they will pump the warm surface ocean water from the supply duct 33 through the openings 32a, 32b and 32c into the inlet chamber 31 for delivery to the plurality of elongated longitudinally extending tubes 28.

Similarly outboard of the outlet header 23 an outlet casing 36 connected about the outlet header 22 define an outlet chamber 37 having a plurality of outlets as at 38a, 38b and 38c which are in turn connected to the common return duct 39 so that after the fluid passes through the longitudinally extending tubes 28 and is discharged into the outlet chamber 37 the ocean water can be returned through the common return duct 39 to the adjacent ocean water from which the same was originally taken.

In order to maintain a continuous "thin film" layer of substantially uncontaminated and relatively pure water as the working fluid in this system, a required amount of such water is charged into the condensate well 16 of the condensing section and the storage chamber or well 15 of the evaporating section 12 and this water during operation transfers from the condensate well 16 to the storage chamber or well 15 in the evaporating section by passing through the U-shaped seal and transfer passage 17 by differential pressure between the condensing section and the evaporating section. This fluid in the storage chamber or well 15 in the evaporating section is further pumped and delivered over the outer surface of the elongated longitudinally extending plurality of tubes 28 which extend through the evaporating space 23 to provide the necessary "thin film" of fluid which is evaporated into vapor or where water is used to steam during the operation of the system.

In order to deliver and distribute the fluid or water to the elongated longitudinally extending tubes 28 in the evaporating space, the longitudinal tubes are divided into a plurality of modules and spaced above each of the modules are a corresponding plurality of distribution trays generally designated 40 which are held in position by openings and supports 41 in the transversely disposed tube sheets 24 so that a plurality of sized openings 42 in the bottom of the distribution trays 40 can distribute a multiplicity of liquid sprays over the tube bundles generally in a relatively uniform flow of liquid jets and drops.

The distribution trays 40 are fed by a suitable pumping system which includes a pump 43 having its suction 44 connected to a drain pipe 45 which communicates with the bottom of the storage chamber or well 15 and its discharge 46 communicates with a supply line 47 in turn connected to a distribution line as at 48 which is in turn connected to a plurality of longitudinal and transverse distribution tray supply lines as at 48a to 48f and 49.

The pump 43 will be of the metering type so that the collected condensate in the storage chamber or well 15 can be distributed by the pump through the supply line 47 and distribution lines 48, 48a to 48f and 49 so as to insure that the liquid supply is sufficient to provide the necessary "thin film" coverage of water over the elongated longitudinally extending tubes 28 in the evaporating chamber 23 so as to evaporate the necessary vapor or steam required for the operation of the turbine at the low pressures at which this system will be operated.

Those skilled in the art will recognize that the evaporator design is not limited to that described above. Other types of conventional evaporator designs appropriate for the type of heat source temperature may be used such as a submerged tube type system wherein the tube bundles are submerged in the heat source fluid or alternatively the system can be reversed in which the working fluid such as water can be passed through the tubes in counter-flow to the heat source fluid which is passed on or about the outside of the elongated longitudinally extending tubes.

Variations in the evaporator section construction and operation are especially adaptable where higher temperature heat sources are available for the system. For example, hot gases from any suitable source.

It will also be understood by those skilled in the art that while the heat source illustrated herein has been warm surface ocean water, that the use of cooling ponds and lakes may also be economically attractive as well as evaporative cooling towers with mechanical drafts or natural draft types and while the "once through" system of operation has been shown in the illustrated form of the invention, this has been illustrated because it is the least costly method of operation it being understood that the evaporator can be constructed so as to provide a multi-pass system in order to absorb the necessary heat for evaporating the vapors or steam at the operating pressures of the system.

By reference to FIGS. 1 and 2 it will be seen that the vapors or steam evaporated in the evaporating section 12 pass upwardly into a collecting chamber 50 where they pass into the inlet 51 of the steam turbine 10 where the vapor or steam is utilized for driving the steam turbine rotors, not shown, in the conventional operation as will be understood by those skilled in the art. The steam is discharged from the turbine 10 into the collection space 52 above the condensing section 13 which is on the side of the common wall 14 remote from the evaporating section 12.

In accordance with the present invention where the working fluid is water the most suitable type of condensing section will be the conventional steam surface type condenser which is also of the shell and tube type with a single path cooling water arrangement as in the case of the evaporating section, the condensing section 13 can be modified so that it may be of the multi-pass type and it can be adapted to the type of vapor which is being condensed from the discharge end of the turbine 10.

Accordingly, referring again to FIGS. 3, 4 and 5, the condensing section 13 is shown as also including an elongated longitudinally extending condenser enclosure or casing 60 which includes the opposite side of the common wall 14 between the condenser and evaporator and an inlet condenser header 61 and an outlet condenser header 62 which elements define with the condenser hot well 16 a condensing space 63. Outboard of the condenser inlet header 61 is a condenser inlet enclosure which is connected about the inlet header 61 and forms therewith a condenser inlet chamber 65 having a plurality of inlets 66a, 66b and 66c which communicate with a common inlet duct 67 which is disposed to extend down to a suitable source of cold below surface ocean water at an approximate depth of 2,000' to provide the cooling water for condensing vapors which are exhausting from the turbine 10.

The inlets are provided with a plurality of pumps as at 68a, 68b and 68c which are driven by associated motors 69a, 69b and 69c so that when the motors are in operation the pump will pump the cold below surface ocean water from the source through the common inlet duct 67 to the inlets 66a, 66b and 66c which communicate with the condensing inlet chamber 65.

Similarly outboard of the outlet condensing header 62 an outlet condensing casing 70 is connected about the outlet condensing header 62 and defines therewith an outlet condensing chamber 71 having a plurality of outlets as at 72a, 72b and 72c which are connected to a common return duct 73 which delivers heated below surface ocean water back to the heat source at any suitable point.

Also at spaced intervals transverse to the longitudinal line of the condensing space 63 a plurality of tube support sheets 74 are held in assembled position by spaced lower girders 75, side supports 76, top supports 77 and intermediate supports 78 and the elongated longitudinally extending tubes 79 are mounted therein so that the inlet end of the tubes 79 can be connected into the condenser inlet header 61 and the outlet end thereof can be connected to the condenser outlet header 62.

It will be understood by those skilled in the art that the condenser shown and above described has substantially similar details to conventional shell and tube condensers of the steam surface condensing type which are known in the art and hence this condensing section has not been more fully shown or described.

It will be noted however that the arrangements for supporting the transverse support plates is a special technique that is identifiable with the present invention and further that the intermediate support members are also provided with elongated rods as at 80 which connect the intermediate members to each other and act to prevent excessive frequency vibration in the condenser during the operation thereof.

When water is used as the working fluid the difference in pressure between the evaporating space in the evaporating section and the condensing space in the condensing section is relatively small and this would also be the case with other working fluids whose working pressure in the evaporator at maximum temperature does not exceed 20 P.S.I.G.

It is however physically possible and economically feasible to take advantage of this small pressure difference by utilizing the difference in the height of the water level between the hot condensate well in the condensing section and the storage compartment or well in the evaporating section of the evaporator-condenser assembly 11 and this is accomplished by the U-shaped seal and transfer passage 17 disposed between the condenser hot well 16 and the storage compartment or well 15.

Figure 5:
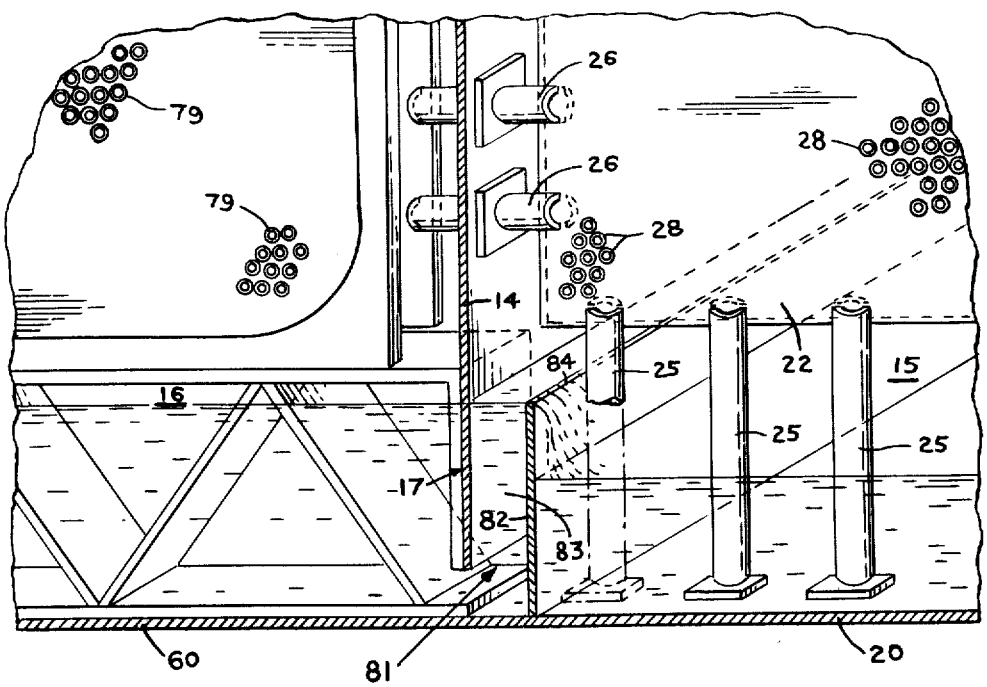
FIG. 5 is an enlarged partial perspective view showing the U-shaped seal and transport passage between the hot well of the condensing section and the storage well of the evaporating section of the evaporator-condenser assembly for the closed cycle system for generating usable energy shown in FIGS. 1 and 2 of the drawings.

Thus as shown in FIGS. 4 and 5 of the drawings the common wall 14 is shown to extend downwardly just short of the lower end of the condenser casing 60. An elongated longitudinally extending transport opening is thus formed at the lower end thereof as at 81.

Disposed in the storage chamber or well 15 of the cooperating section 12 on the side of the common wall 14 opposite from the condensate hot well 16 and a predetermined spaced distance therefrom is an elongated longitudinally extending barrier or partition 82 which is connected to the bottom of the evaporating section casing 20 and extends upwardly to a point approximately ¾ of the height where the level of the hot condensate will collect in the condensing section 16 and thus a transfer passage or space 82 is formed between the common wall 14 and the partition or wall 82 which communicates with the transport opening 81.

Thus, the condensate hot well, transport opening 81, and transport passage or space 83 define a U-shaped flow passage which acts as a seal and also as a transfer means for passing hot condensate from the hot condensate well 16 to the storage chamber or well 15 because the upper end 84 of the baffle or partition 82 acts as a weir over which the hot condensate flows as a function of the differential height of the condensate or water at the operating pressures in the condensing section 13 and evaporating section 12.

Such seal can be provided between the two sections of the evaporator-condenser assembly with a partition or wall 82 between the two sections to permit a water level build-up of approximately 3' in the condensing section for the normal application with a heat source temperature of 160° F. At higher temperatures greater water level differences are needed and at lower temperatures lower water levels will suffice.

Where other working fluids such as fluorocarbons or ammonia are used condensate must be returned to the evaporator by means of a hot condensate well pump in the conventional fashion due to the difference in vapor pressure that will exist between the evaporating section and condensing section, at the intended working range for the operating cycle of the type applicable to the present invention.

OPERATION

Figure 6:
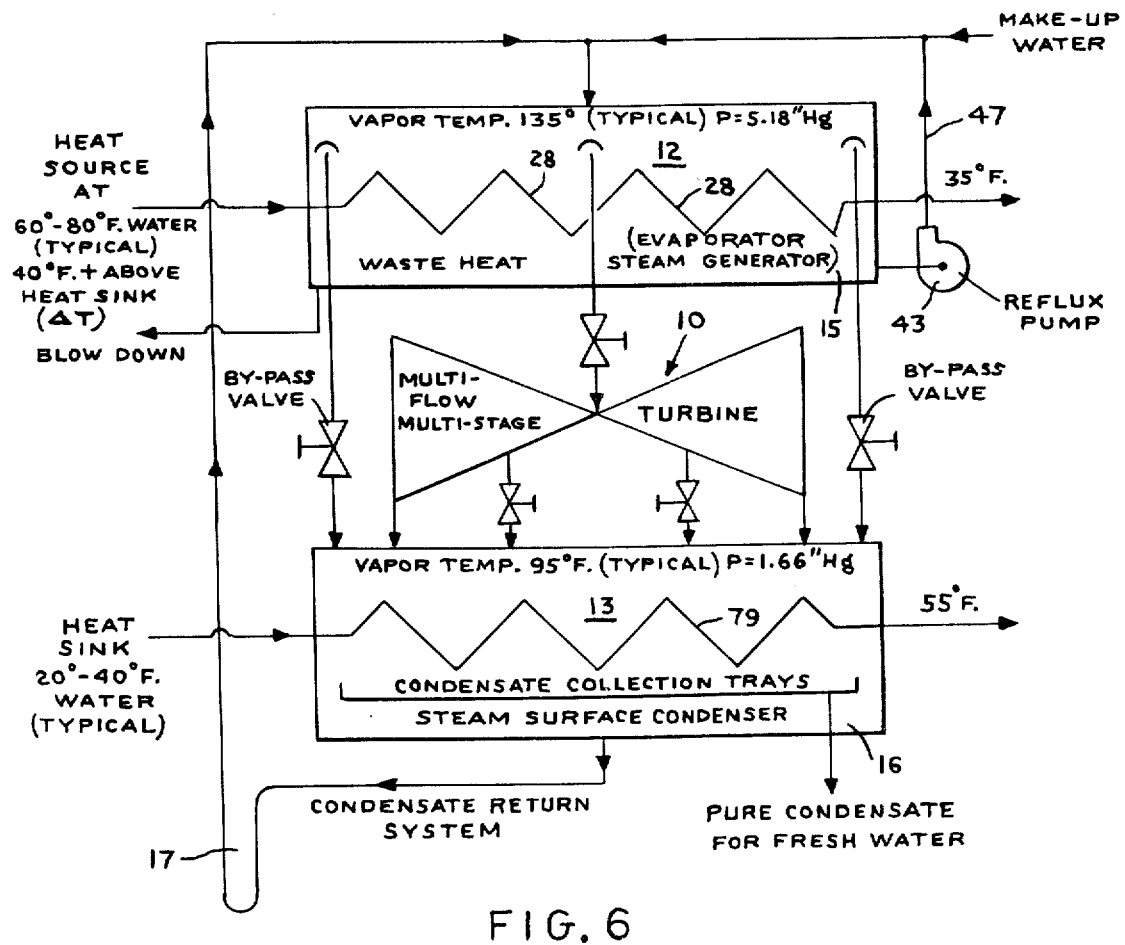
FIG. 6 is a flow diagram for the closed cycle system for generating usable energy as shown in FIGS. 1 and 2 of the drawings.

The invention is best understood with reference to FIG. 6 which depicts schematically the fluid flow pattern in the system as above described.

As applied to an OTEC System, the operation will assume that the ocean water surface (the heat source) will be in the range between 60° F. to 80° F. and the below surface ocean water at about 1500' (the heat sink) will be in the range between 20° F. and 40° F. These ranges will provide a net temperature differential ($\Delta T$) of about 40° F. between the heat source and the heat sink.

It will also be understood for reasons as hereinabove described that the working fluid in the system is water.

Before start-up a source of make-up water is supplied to the system through a connecting line 90 by opening the valve 91 and operating the delivery pump 92 so as to flood the hot condensate well and the evaporating section storage compartment or well 15 up to the level where water flows through the U-shaped seal 17 and transfer passage to the storage compartment or well 15.

By any suitable device such as a steam operated evaporating orifice, now shown, a vacuum is applied to the evaporating section so as to reduce the pressure therein to approximately 5" of water.

Next, the motors 35a, 35b, 35c are placed into operation so as to drive the pumps 34a, 34b and 34c so that the hot surface water, the heat source is drawn through the common inlet duct 33 and the inlets 32a, 32b and 32c to fill the evaporating section inlet chamber 31 with hot surface ocean water to pass the same through the elongated longitudinally extending tubes 28 to the evaporating section outlet chamber 37. The heat source surface water now reduced in temperature is then returned through the outlets 38a, 38b and 38c to the common return duct 39 in the manner above described.

The circulating pump 43 is now placed into operation to circulate collected water from the evaporating section storage chamber or well 15 and delivery line 47 to the connecting lines 48, 48a to 48f and 49 for delivering the collected water to the trays where this water passes over the outer surface of the elongated longitudinally extending tubes and evaporates to develop the required head of steam in the evaporating space 23.

The steam collected in the evaporating space 23 flows upwardly through the collecting space 50 and then into the inlet throttling valve assembly 51 which controls the operation of the rotors, now shown, in the turbine 10 thus converting the heat energy in the steam to mechanical energy for driving a generator, pump or other device.

This steam will exhaust from the turbine at a lower pressure and lower temperature into the condensing section collecting space 52 and will travel downwardly through the condensing space 63 over the elongated longitudinally extending condenser tubes 79.

The motors 69a, 69b and 69c will drive the pumps 68a, 68b and 68c so as to draw the cold below surface ocean water, the heat sink water, through the common supply duct 67 and the inlets 66a, 66b and 66c into the condenser section inlet chamber 65 where the same enters through the inlet end of the plurality of condenser tubes 79 and is discharged through the outlet end thereof into the condensing section outlet chamber 71 where the same is passed through the outlet 72a, 72b and 72c to the common return duct 73 for returning the heat sink ocean water coolant to the heat source namely, the ocean surface water.

The flow of this cooling water through the condenser will act to condense the steam delivered into the condensing space and the condensate therefrom collects in the condenser hot well 16.

While the pressure difference between the evaporator and the condenser are relatively low, the difference in the water level in the respective condenser hot well 16 and the storage chamber or well 15 nonetheless will be sufficient to force the required return flow of water through the transfer flow passage 83 across the weir 84 on the partition 82 to the storage chamber or well 15 for further use in connection with the operation of this closed cycle system.

The quantity of water from the storage chamber or well 15 pumped to each of the tray distributors is equal to the amount of vapor generated in the evaporating section plus an additional amount to assure that the elongated longitudinally extending tubes 28 are maintained continuously in a state where a "thin film" of water covers the same. Any excess water falls through the various distributing trays down through the modular bundles of elongated longitudinally extending evaporator tubes and the excess water is returned to the storage chamber or well 15 for recycling as may be required. The storage well quantity is adjustable by suitable metering adjustments of the circulating pump 43 and this can be set to provide optimum performance for the evaporating section of the evaporator-condenser assembly 11.

Thus there is illustrated above a plurality of components for a heat transfer system which effectively converts available low temperature energy into useful power in a reliable and economical manner.

It will be understood that the invention is not to be limited to the specific construction or arrangement of parts shown but that they may be widely modified within the invention defined by the appended claims.

What is claimed is:

1. A closed cycle system for recovering usable energy from the difference in temperature between a heat source and a heat sink wherein the available temperature difference is at least 40° F., includes, a. an evaporator-condenser assembly having a non-contacting evaporating section, a non-contacting condensing section, and a common partition mounted in and shared between the evaporating section and the condensing section so as to define respectively therein an evaporating chamber having a storage well for the operating fluid for the closed cycle system and a condensing chamber having a condensate well for condensed operating fluid, and said common partition having transport opening means at the lowermost end thereof, b. a short upwardly extending baffle means connected in the evaporating section a predetermined spaced distance from the common partition to form therewith a U-shaped seal and transport passage for passing predetermined quantities of the condensed operating fluid from the condensate well to the storage well as a function of the difference in the level of operating fluid in the respective condensate well and storage well, c. said evaporating section including, means for evaporating operating fluid including, pumping means connected to deliver heated fluid from said heat source, and a return means for returning said heated fluid to said heat source, d. energy converting means connected to said evaporator-condenser assembly having an inlet communicating with said evaporating section to receive the vaporized operating fluid therefrom and operable to convert the heat energy in said vaporized operating fluid to usable energy, and an exhaust outlet for spent vaporized operating fluid, e. said condensing section communicating with the exhaust outlet of said energy converting means and including, means for condensing the exhausted vapor from said energy converting means including, pumping means connected to deliver cooling fluid from said heat sink, and a return means for returning the cooling fluid to said heat sink.

2. In the closed cycle system as claimed in claim 1 includes, a. control valve means for controlling the flow of vaporized operating fluid to said energy converting means for regulating the operating thereof.

3. In the closed cycle system as claimed in claim 1 including by-pass means for partially by-passing a portion of the vaporized operating fluid about said energy converting means.

4. In a closed cycle system as claimed in claim 1 wherein the evaporating section includes means for maintaining a thin film of operating fluid to be evaporated on said means for evaporating said operating fluid.

5. In a closed cycle system as claimed in claim 1 or 4 wherein the operating fluid is water.

* * * * *